United States Patent [19]
Call et al.

[11] 3,914,173
[45] Oct. 21, 1975

[54] MINI SEWAGE TREATMENT SYSTEM

[76] Inventors: Donald H. Call, 39 Garth Road, West Roxbury, Mass. 02132; Elbridge L. Atwood, 3 Lantern Lane, Abington, Mass. 02351; Joseph A. Cary, 134 Auburn St., Brockton, Mass. 02402; James D. Surette, 105 Prospect St., Braintree, Mass. 02184

[22] Filed: Apr. 8, 1974

[21] Appl. No.: 459,070

Related U.S. Application Data

[62] Division of Ser. No. 284,726, Aug. 30, 1972, Pat. No. 3,825,494.

[52] U.S. Cl. .................. 210/5; 210/15; 210/63; 210/64
[51] Int. Cl.² .................. C02C 1/08; C02B 3/00
[58] Field of Search .......... 21/54 R, 102 R, DIG. 2; 210/4–7, 15, 16, 63, 64, 73, 195, 199, 197, 202, 220; 250/432, 435, 436, 438

[56] References Cited
UNITED STATES PATENTS

| | | | |
|---|---|---|---|
| 3,119,770 | 1/1964 | Cunetta | 210/15 |
| 3,306,447 | 2/1967 | Medeiros | 210/202 X |
| 3,382,981 | 5/1968 | Hampton | 210/195 X |
| 3,419,146 | 12/1968 | Koulovatos | 210/220 X |
| 3,487,937 | 1/1970 | Koulovatos | 210/195 |
| 3,539,507 | 11/1970 | Woodbridge et al. | 210/64 X |
| 3,659,096 | 4/1972 | Kompanek | 210/64 X |
| 3,672,823 | 6/1972 | Boucher | 21/DIG. 2 |

FOREIGN PATENTS OR APPLICATIONS

| | | | |
|---|---|---|---|
| 402,116 | 9/1909 | France | 250/432 |
| 468,216 | 7/1914 | France | 250/432 |

*Primary Examiner*—Samih N. Zaharna
*Assistant Examiner*—Robert H. Spitzer

[57] ABSTRACT

This invention pertains to an efficient ecological waste sewage system which eliminates the necessity of large leaching beds or seepage pits from cesspool digested sewage effluents. It consists of the system, the apparatus and the method for effecting the disposal of such sewage waste by preliminary digesting the raw waste material, preferably in primary and secondary digesting steps, passing the resulting liquid with fine solids therein in sequence and in controlled consecutive order to a series of settling tanks, subjecting the liquid effluents therefrom to a simultaneous aeration — ultra violet ray sterilization treatment, and removing the water effluent therefrom as re-usable water. New and novel aeration-irradiation treatment units are disclosed which provide a novel, very efficient system for effecting the elimination of sewage waste in areas where sewers are not available or where land type and quality prevent the use of present day systems for the disposal of said wastes and producing useable water therefrom.

1 Claim, 4 Drawing Figures

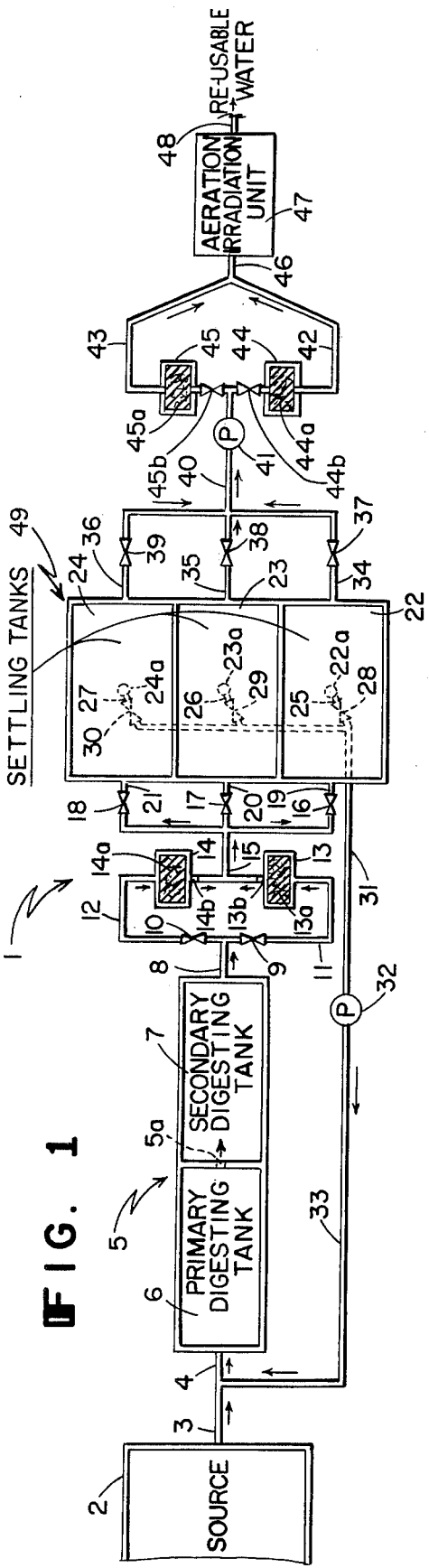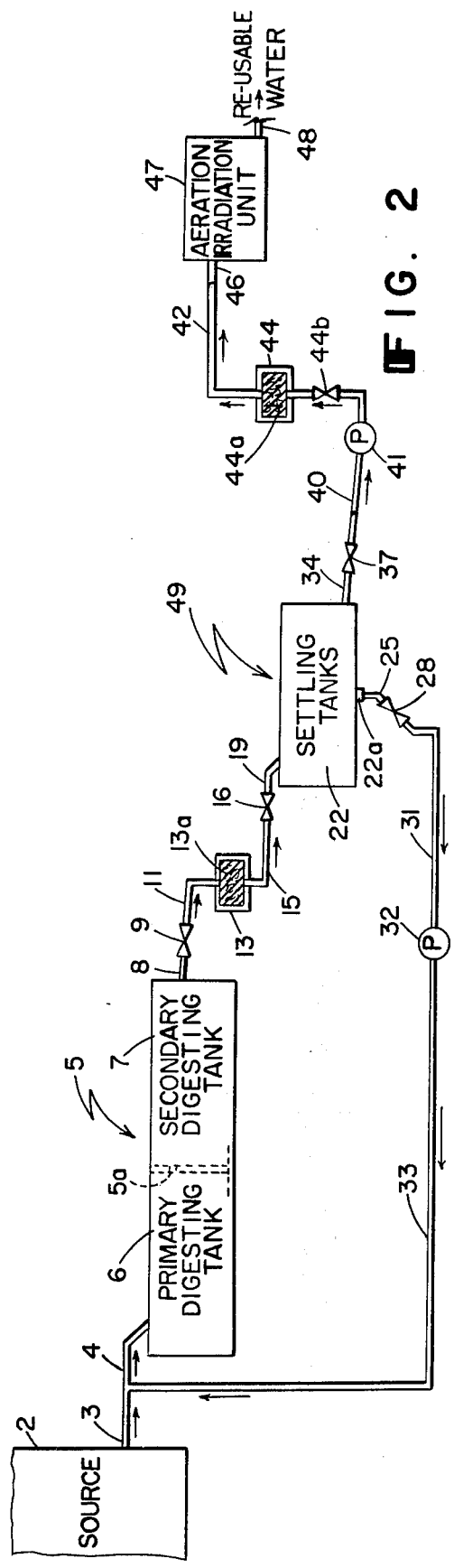

MINI SEWAGE TREATMENT SYSTEM

The present application is filed in compliance with the examiner's division requirement in applicant's prior application Ser. No. 284,726 filed Aug. 30, 1972 which case has now resolved into issued U.S. Pat. No. 3,825,494 of July 23, 1974.

This invention relates generally to the elimination of sewage waste in areas where sewers are not available or where the use of known present day methods and systems for the disposal of said wastes are inapplicable due to character and quality or the type of the available land prevents its usage for the desired purpose. This mini-sewage treatment system is most especially adaptable for small homes which include one, two or three bedrooms, as well as medium sized apartment buildings such as those that include approximately 100 bedrooms. In the case of larger apartment buildings, such as those which include more than 100 bedrooms, two or more of this system of disposal could be utilized depending of course upon size and arrangement. It will also be apparent that our system is also adaptable for use in conjunction with the treatment of the resulting water which has been used for industrial process purposes, as well as wastes from toilets for disposal of human excrements.

In conjunction with the above it should be pointed out that even in areas where natural ground is acceptable for existing disposal systems, the length of time that a leaching bed may be used is extremely uncertain and limited. In this respect public health regulations often require that a reserve area for standby purposes be provided in the overall total system in the event the initial area becomes inoperative or ceases to provide the necessary drainage. In addition, regulation of government agencies having proper jurisdiction usually follow codes that establish daily design flow in gallons for various types of buildings. These codes, of necessity, are established on a very conservative basis to protect the owner or occupant of the building insofar as possible. Very often the requirement for a specific building on a given site creates a demand which the site cannot accomodate.

Generally, present day disposal systems in common use today include a septic tank which receives raw sewage from a building. After the sewage is digested, the effluent is discharged through a series of perforated pipes to a disposal bed and/or seepage pit. The system works fairly efficiently when new or first installed. However as time passes, the bed gradually becomes coated or even clogged with residue and/or semi-solids which results in a slow down of drainage and improper elimination of the residue. Nothing is provided in the basic system to digest completely all solids or to really neutralize, deodorize and clean the liquid effluent. Often extra heavy rainfall and winter runoff mix with semi-treated sewage to thus pollute the surrounding areas and create a problem ecologically.

Another method and system in common usage today is to install a cesspool. A cesspool is usually constructed of concrete blocks, laid up with openings on every course to permit fluids to flow into the ground without creating a back-up. The solids are digested by bacterial action and converted to a liquid. However, no positive action or reaction occurs to neutralize, deodorize or purify the liquid effluent. Here again great dependance is placed on ground conditions surrounding the cesspool to permit the flow out of the cesspool and into the ground without creating a back-up. In this respect it is also pointed out that in many locations at or near the waterfront of the oceans and rivers, the land upon which houses and other structures were built or are presently under consideration either were too small to provide leach areas or were partially built upon solid stone or rock ledges and could provide at best only a cesspool with the effluent liquids and solids therefrom would by necessity run directly into the rivers or ocean.

The present method and system for treating sewage wastes overcomes all the disadvantages noted above and provides the removal of the impurities, including particulate matter, solids, and odors from the waste effluent prior to its being discharged from the "mini-sewage system" which will be fully described hereinafter.

This invention consists in the method and apparatus and system for carrying out the same hereinafter set forth such as illustrated in the accompanying drawings wherein like numerals as used for like parts in FIGS. I and II and in which:

FIG. 1 is a sequence schematic plan view of the "mini-sewage treatment system" in accordance with our invention.

FIG. 2 is a sequence schematic elevation view of the system of FIG. I.

Figure 3:
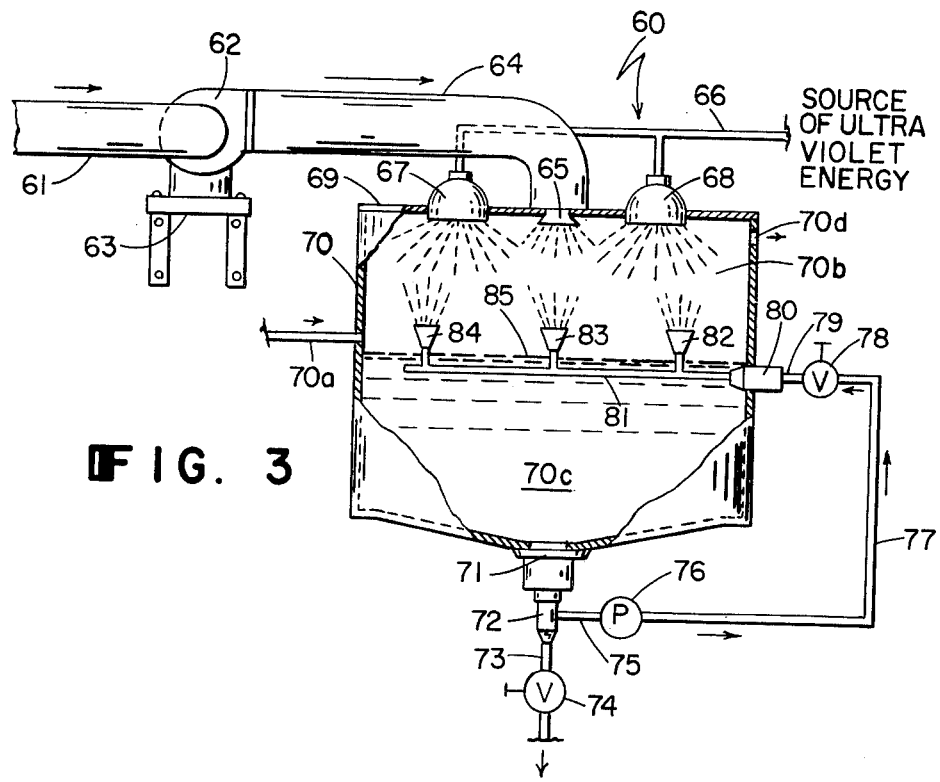
FIG. 3 is a detailed sectional view of an aeration-irradiation unit of FIG. I.

Referring to FIGS. 1 and 2 the waste disposal system of the present invention is illustrated as a "mini-sewage system" wherein the source of the sewage 2 such as a building, toilet, etc., is adapted to flow through pipes 3 and 4 into septic tank unit 5, the latter including a primary digesting tank 6 which permits digestion by bacterial action of the solids received from, for example, a building sewage drain. After remaining in the primary receiver tank 6 for a period of time the partially digested effluent from the tank flows to a secondary digesting tank 7, for example by gravity, through a pipe 5a connecting said two tanks, said connecting pipe 5a being located at a predetermined level.

After remaining in the secondary tank 7 for a period of time, the effluent with impurities therein flow by gravity through line 8 through a set of strainers 13 and 14, having ¼ inch plastic screening 13a and 14a respectively therein, the flow through said strainers being controlled by solenoid valves 9 and 10, respectively, whereby the effluent from the secondary digesting tank through pipe lines 11 and 12 flows into one of three settling tanks 49 by virtue of pipe 15 and connecting solenoid valves 16, 17, or 18, through pipes 19, 20, or 21. The tank selection is on a rotating basis which is controlled by a time clock (not shown) which operates said solenoid valves 16, 17 and 18 respectively. The main function of strainers 13 and 14 is to break up solids that may have been carried over from the secondary digesting tank 7 into said settling tanks, the flow being controlled first by the solenoid valves 9 and 10 and then by solenoid valves 16, 17 and 18 at the inlets to settling tanks 22, 23 and 24 of the set of settling tanks structure 49. It is also to be noted that solenoid valves 9 and 10 are controlled by a pressure sensor (not shown) which is designed to sense the pressure of the flow, should the pressure exceed a predetermined level the sensor would change the flow from one strainer to the other strainer (13 or 14) and activate an alarm (not shown) for required service.

The structure of the settling tanks 49 is shown to consist of three sections 22, 23, and 24 arranged in parallel so that only one tank is permitted to receive the effluent at any one time. The tanks may be set up on a three day cycle so that if one tank is receiving, a second tank is emptying and the third tank is lying dormant. When the timer controlling the solenoid valves trips over to the next cycle (for example the next day), the second tank is receiving, while the third tank is emptying and the first tank is lying dormant; on the next change of sequence, for example 24 hours after the previous change, the time clock repositions the solenoid valves to permit the third tank to receive, the first tank to empty, and the second tank to lie dormant. Each tank, of course, would have sufficient capacity to provide for at least a 24 hour settling period before the effluent flows to the filters 44 and 45.

Filter cells 44a and 45a are of a standard make replaceable honeycomb carbon cartridges which provide efficient filtration, said honeycomb structure removing microscopic solids, the inner core of activated carbon neutralizing objectionable odors by adsorption action. Such filters are easily serviced, readily replaceable.

The sediment in the settling tanks 49 may be automatically removed through pipes 28, 29 and 30, from sumps 22a, 23a and 24a by virtue of pump 32 through pipes 31 and 33 to be recirculated at predetermined intervals through primary and secondary digesting tanks 6 and 7 as shown in the drawings. It is also apparent that, if desired, the sediment in the secondary digesting tank 7 could be similarly pumped into recirculating line 33 back into the primary settling tank 6 (not shown). The purpose of pumping these sediments back through the raw sewage connections 3 and 4 is to expose said sediment to longer time periods in the digesting tank sequence, thus permitting the sediment addition exposure to bacterial action which would act on the semi-solids to reduce the same to a liquid state.

The supernatant liquids from settling tanks 49 operated by solenoids 37, 38 and 39 are pumped (41) from outlet lines 34, 35, and 36 from the individual settling tanks 22, 23, and 24, through line 40 into filters 44 and 45, which contain the honeycomb carbon cartridges 44a and 45a, then through pipes 42 and 43 and 46 into an aeration-irradiation unit 47 (which will be fully described in detail hereinafter) and discharged through outlet pipe 48 as reusable water which can be used for many desired purposes. It is also to be noted here in conjunction with the filters 44 and 45 (as with the previously described strainers 13 and 14) that a pressure sensor (not shown) activates solenoid valves 44b and 45b. The sensor is designed to sense the pressure of the flow, and when the pressure exceeds a predetermined level the sensor would change the flow from one filter to the other filter (44 and 45) and activate an alarm (not shown) for service required.

FIG. 3 presents a detailed sectional view of a novel aeration-irradiation unit 60 which has proven very efficient and effective in the "mini sewage waste treatment system" of this invention identified in FIGS. 1 and 2 as 47. This unit 60 comprises a sump type receiver 70 having a sealed top cover 69. Above the level of the liquid is located the inlet pipe 70a through which the liquid, after having passed through the filters 44 and 45 of FIG. 1, flows into said tank to a level 85 just below the inlet water pipe 70a. The sump type tank receiver 70 may be sized, for example, to retain approximately 1/24 of the daily liquid flow through the system. Just below the level 85 of the liquid to be treated (70c) a series of one or more fog nozzles (shown as three here) 82, 83 and 84 are located and function to spray in the form of a mist said liquid 70c into the chamber 70b of said tank. Fresh air is introduced as at 61, by virtue of centrifugal fan 62 located on stand 63, through duct 64 into said chamber 70b through an air diffuser 65. In addition to the fresh air inlet, infra-red lamp and reflector assembly 67 and 68 diffuses sterilizing ray energy into chamber 70b. Conduit 66 indicates electric supply to power the ultra-violet ray lamp. An outlet 70 (d) is provided in the upper section of the chamber 70b to allow the escape of the excess air not required for aeration.

The liquid 70c is recirculated through a tank drain 71 at the bottom of said tank and a valve 72 which operates to pass said liquid by virtue of pump 76, into pipes 75, 77 and connection coupling 80 when shut-off valve 78 is open into the horizontal pipe 81 for liquid distribution through spray nozzles 82, 83, and 84. When cut-off valve 78 is closed and shut-off valve 74 is open the treated water is passed through the reducer 73 and out through said open valve 74 as the product water, which is the odorless, sterile, useful, re-usable water of this invention.

It will be noted that the number of liquid spray nozzles and infra-red lamps employed would depend upon the physical dimensions of tank 70 and are not a limiting factor in this disclosure.

Figure 4:
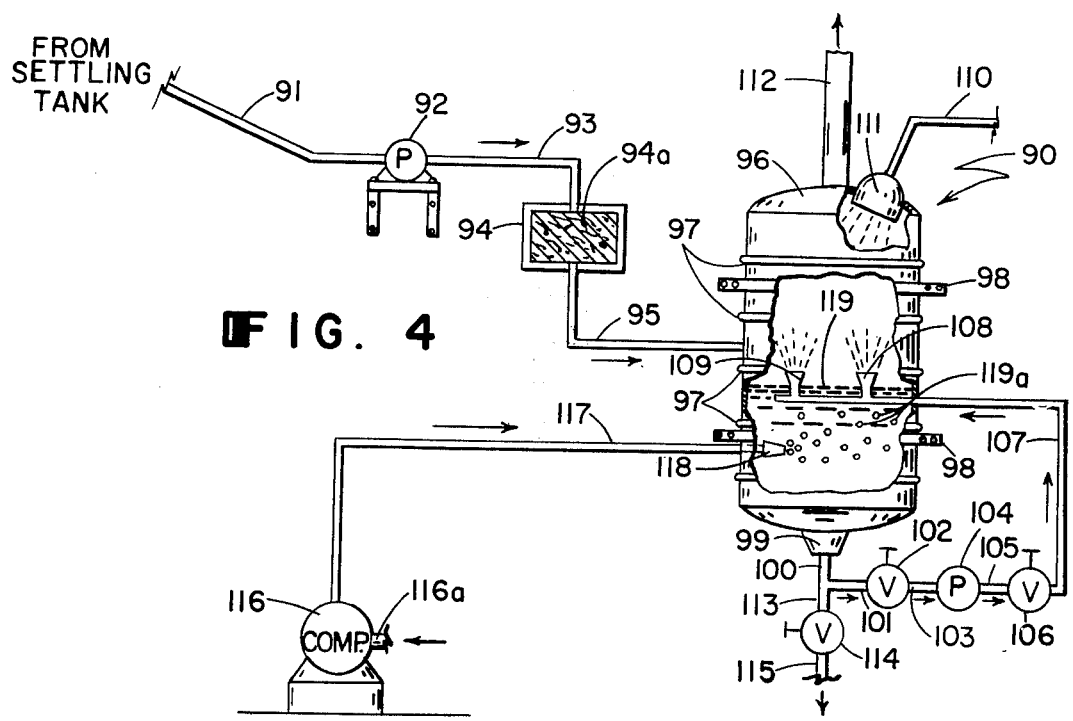
FIG. 4 is a detailed sectional view of a modified aeration-irradiation unit of FIG. 3.

FIG. 4 presents a variation of the aeration-irradiation unit of FIG. 3 in that the liquid from the settling tank 49 of FIG. 1 is passed through pipe 91 by virtue of sediment pump 92 and pipe 93 into filter 94a and through pipe 95 into the treating tank 96 of the unit 90. The maximum liquid level 119 is shown with spray fog nozzles 108 and 109 extending above the liquid level but supplied below said liquid level 119 by pipe 107, and wherein the treated liquid is recirculated by virtue of pump 104 near the bottom of tank through reducer 99, pipes 100, 101, 103 and 105 with cut-off valves 102 and 106 on both sides of said pump 104 in said pipe 105 in open position, and cut-off valve in pipe 113 in closed position. Fresh air is supplied at 116a by compressor 116 which supplies air bubbles 119a under pressure to the tank liquid through line 117 and perforated reducing nozzle 118. The ultra violet sterilizing lamp assembly 111 (electric energy supplied through conduit 110) is shown at the top wall of tank 96 with the outlet 112 for escape of the excess air not required for aeration at the top of dome-shaped wall cover of said tank 96. The operation of this spray unit may continue for approximately thirty minutes out of each hour for best results. Brackets 97 and 98 secure the unit 90 to a wall or other support. When cut-off valves 101 and 106 are in open position and cut-off valve 114 in pipe 113 is closed it is seen that recirculation of the liquid in the tank is in operation. When cut-off valve 106 is closed and cut-off valve 114 is open the purified product water is obtained at outlet 115 for further use as desired.

It will be readily understood that the flow of the filtered water exposed to the ultraviolet lamp rays simultaneously in conjunction with the aeration section in the fresh air chamber 70b (FIG. 3) or the bubbling of fresh air through the filtered water from the settling tank (FIG. 4) before contact of said aerated filtered water with the ultraviolet rays in the open area above said water level would be controlled so that the material (filtered water) would be exposed to said ultraviolet rays a sufficient length of time for sterilization purposes.

The liquid which is finally drawn off as the end product of our system described above will be found to be free of harmful bacteria and harmful germs of all kinds. The water is odorless and is reusable for all purposes. This water is non-injurious to the health of the inhabitants, or the life in any body of water. It is also to be noted that the present described system may be located below or above the ground level and the liquid could flow by gravity through the described system.

A summary of the electrical sequence in the sewage treatment system referred to hereinabove is very broadly described as follows:

Raw sewage flows by gravity from the source (home, commercial building, factory, etc.) into the primary digesting tank. When the sewage reaches a predetermined level, the sewage flows by gravity to a secondary digesting tank. After collecting in the secondary digesting tank the liquid and semi-solids flow through a strainer into one of three settling tanks.

The flow leaving the secondary digesting tank is directed to either of three settling tanks by means of a timer operating on a seventy-two hour sequence control which cycles electric solenoid valves. This arrangement determines which tank is filling, which tank is emptying, and which tank is lying dormant.

After the material has settled for the prescribed period of time (namely 24 hours) it flows through a filter to the effluent pump and then is pumped to the aeration-irradiation unit.

A liquid level probe is inserted in each of the settling tanks, connected to the effluent pump, through a relay which is operated from the outlet solenoid and arranged to stop the operation of the pump when the level of the liquid reaches a predetermined low point in the settling tank.

There is also a high level probe installed in the tank of the aeration-irradiation unit which is connected in series with the aforementioned low level probes, designed to stop the effluent pump when a predetermined high level has been reached in the aeration-irradiation tank.

A second probe is installed in the aeration-irradiation tank which energizes a timer arranged to start the aerator circulator and the supply air fan or to open a solenoid valve in the compressed air line. (The irradiation lamp is energized continuously.) The timer operates the foregoing two elements for 30 minutes after which they are stopped and the drain solenoid opens to permit the clean water to flow out of the aerator tank. Once the tank is drained and the solenoid drain valve is closed, the circuit is completed to start the settled effluent pump to run through another cycle (provided that water is available in the active settling tank).

Modifications and changes in the illustrated embodiments will suggest themselves to those having ordinary skill in the art. Changes such as these are contemplated by the principles of this invention so that although for ease of description, the principles of the invention have been set forth in connection with certain illustrated embodiments, it is not intended that these embodiments, or terminology employed in describing them, are to be limiting but it is our intention to be restricted only by the scope of the appended claims.

Having thus described our invention, we claim:

1. A method of treating raw human waste sewage to reduce it to a sterilized filtered odorless water product, comprising the steps of:

conducting said raw sewage to a primary digesting tank and digesting the sewage by bacterial action on the solids therein, conducting the sewage from said primary digesting tank to a second stage digesting tank to obtain more complete bacterial action to further digest the sewage, selectively passing the digested product from said second tank through one of two strainers of plastic screening material of approximately one fourth inch mesh in alternate sequence, controlling said sequence in accordance with the fluid conducting condition of the strainers, selectively passing the product from the strainers into a first one of three settling tanks for a predetermined period of time to permit any remaining sediment to settle to the bottom of the tank, after the passage of said predetermined period of time, passing the product from the strainers into a second of the three settling tanks while allowing the first tank to lay dormant, passing the product from the strainers to the third of the three settling tanks after the product has passed into the second tank for said predetermined period of time and while the product is being passed into the third settling tank, emptying the first tank and allowing the second tank to remain dormant, returning a portion of said product from said settling tanks to said primary digesting tank for recirculation at predetermined intervals, passing said product from said settling tanks selectively to one of two filtering and odor neutralizing cells in alternate sequence, controlling said sequence in accordance with the fluid conducting condition of the cells, passing said product from said filtering and odor neutralizing cells to an aeration-radiation unit, breaking said product up into minute particles in said aeration-radiation unit and flooding said particles with sterilizing ultra-violet rays, and removing the product therefrom as re-usable water.

* * * * *